# 2,901,459

RUBBER COMPOSITIONS CONTAINING NITROSO ALIPHATIC ARYLENEDIAMINES

Dudley B. Merrifield, Charleston, W. Va., assignor to Monsanto Chemical Company, St. Louis, Mo., a corporation of Delaware No Drawing. Application May 16, 1955
Serial No. 508,791

12 Claims. (Cl. 260—45.9)

The present invention relates to the treatment and preservation of rubber. More particularly the invention relates to rubber compositions treated with N-nitroso-N,N'-di-substituted arylenediamines.

Rubber stocks commonly contain an antioxidant or age resistor. Presumably an antioxidant protects rubber by terminating a chain reaction induced by oxygen. However, deterioration of rubber is a complicated phenomenon. Oxygen definitely is not the only cause of degradation. For example, presence of ozone in the atmosphere rapidly degrades rubber. A myriad of cracks form on the surface. Waxes which form a protective surface film are useful to inhibit exposure cracking if the rubber is not flexed but protection is lost once the film breaks. Chemical antiexposure cracking agents are therefore needed but unfortunately adjuvants which protect against one type of degradation are not necessarily effective against another.

In accordance with the present invention it has been discovered that nitroso N,N'-di-substituted-arylenediamines are effective general purpose anti-degradation agents and chain breakers for sulfur vulcanizable elastomers. They are both age resistors and exposure cracking inhibitors. These adjuvants may be represented by the general formula

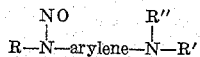

where R and R' are the same or different aliphatic radicals, saturated or unsaturated, or alicyclic radicals and R" represents another nitroso group or hydrogen. The lower members are quite volatile and it is preferred that R and R' each contain at least four carbon atoms. The new adjuvants excel amines heretofore proposed in important respects. For example, amines tend to activate the cure causing pre-vulcanization or scorch whereas the hereindescribed nitroso compounds are free from this defect.

The anti-degradation agent may be incorporated into the rubber by milling, Banbury mixing or similar procedure, added to the rubber latex before coagulation or applied to the surface of a mass of crude or vulcanized rubber. By rubber is meant sulfur vulcanizable diene elastomers. These include polymers of butadiene, isoprene, piperylene, dimethyl butadiene, ethyl butadiene and copolymers, as for example co-polymers with styrene, alpha-methyl styrene, monochlorostyrene, dichlorostyrene, divinyl benzene, vinylnaphthalene, vinyl biphenyl, vinyl carbazole, 2-vinyl-5-ethyl pyridine, acrylonitrile, methacrylonitrile, acrylic acid, methacrylic acid, ethyl acrylate and methyl vinyl ketone.

Typical examples of the invention comprise rubber compositions treated with one or more of the following: N,N'-dimethyl-N,N'-dinitroso-p-phenylenediamine, N,N'-diethyl-N,N'-dinitroso-p-phenylenediamine, N,N'-dipropyl-N,N'-dinitroso-p-phenylenediamine, N,N' - di-isopropyl - N,N' - dinitroso-p-phenylene-diamine, N,N' - diallyl-N,N'-dinitroso-p-phenylenediamine, N,N'-di-2-chloroallyl-N,N'-dinitroso-p-phenylenediamine, N,N'-di-3-chloroallyl-N,N'-dinitroso - p - phenylenediamine, N,N'-di-2,3-dichloroallyl N,N'-dinitroso-p-phenylenediamine, N-cyclohexyl-N'-2-chloroallyl-N,N' - dinitroso - p - phenylenediamine, N,N'-dibutyl-N-nitroso-o-phenylenediamine, N,N'-di-isopropyl-N-nitroso-o-phenylenediamine, N,N'-dimethyl-N-nitroso - o - phenylenediamine, N,N' - dicyclohexyl-N,N' - dinitroso-p-phenylenediamine, N,N' - di - isobutyl-N,N'-dinitroso-p-phenylenediamine, N,N'-dihexyl-N,N'-dinitroso-p-phenylenediamine, N,N'-dihexenyl-N,N'-dinitroso-p-phenylenediamine, N,N'-dioctyl-N,N'-dinitroso-p-phenylenediamine, N,N'-dioctenyl-N,N'-dinitroso-p-phenylenediamine, N,N'-diheptyl-N,N'-dinitroso-p-phenylenediamine, N,N'-diheptenyl-N,N'-dinitroso-p-phenylenediamine, N,N'-dinonyl - N,N'-dinitroso-p-phenylenediamine, N,N' - dinonenyl - N,N' - dinitroso - p - phenylenediamine, N,N'-didecyl-N,N'-dinitroso-p-phenylenediamine, N,N'-didecenyl-N,N'-dinitroso-p-phenylenediamine, N,N' - diundecyl-N,N'-dinitroso-p-phenylenediamine, N,N'-diundecenyl-N,N'-dinitroso-p-phenylenediamine, N,N'-didodecyl-N,N'-dinitroso-p-phenylenediamine, N,N' - didodecenyl-N,N'-dinitroso-p-phenylenediamine, N,N'-dibutyl - N,N'-dinitroso-p-phenylenediamine, N,N'-di-sec-butyl-N,N'-dinitroso - p - phenylenediamine, N-sec-butyl-N'-isopropyl-N,N'-dinitroso-p-phenylenediamine, N-sec-butyl-N'-cyclohexyl-N,N'-dinitroso-p-phenylenediamine and N,N'-dicyclo-hexyl-N-nitroso-p-phenylenediamine.

These compounds may be prepared from N,N'-di-aliphatic-p-phenylenediamines by suspending the amine in an organic solvent, adding hydrochloric acid slightly in excess of that theoretically required to form the hydrochloride of the amine and then gradually adding sodium nitrite. The amines may be prepared in known manner by the reductive alkylation of p-phenylenediamine, p-nitroaniline or an N-aliphatic p-nitroaniline with a suitable ketone or aldehyde, as for example mesityl oxide, vinyl butyl ketone, phorone, butylaldehyde and heptaledehyde. The compounds containing a double bond in the aliphatic chain have also been known as N,N'-dialkylene-p-phenylenediamines, as for example N,N'-dioctylene-p-phenylenediamine,

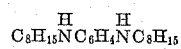

As illustrative of the control of exposure cracking of vulcanized sulfur-vulcanizable synthetic rubber-like materials, rubbery butadiene-1,3-styrene copolymer stocks were prepared as follows:

| Stock | A | B | C | D |
|---|---|---|---|---|
| | Parts by weight | | | |
| GR-S 1500 | 100 | 100 | 100 | 100 |
| Carbon black | 50 | 50 | 50 | 50 |
| Saturated hydrocarbon softener | 10 | 10 | 10 | 10 |
| Zinc oxide | 4 | 4 | 4 | 4 |
| Stearic acid | 2 | 2 | 2 | 2 |
| Sulfur | 1.75 | 1.75 | 1.75 | 1.75 |
| N-Cyclohexyl 2-benzothiazole sulfenamide | 1.2 | 1.2 | 1.2 | 1.2 |
| N,N'-Dicyclohexyl-N,N'-dinitroso-p-phenylenediamine | | 1.5 | | |
| N,N'-Dicyclohexyl-N-nitroso-p-phenylenediamine | | | 1.5 | |
| N,N'-Di-sec-butyl-N,N'-dinitroso-p-phenylenediamine | | | | 1.5 |

The ingredients were admixed on a rubber mill in the customary fashion and the respective compounded stocks were cured in a press at 144° C. for 45 minutes. Since evaluation under static conditions is not indicative of the service obtained with many types of rubber articles which must withstand flexing, the vulcanized compositions were evaluated under dynamic conditions in an atmosphere containing a definite concentration of ozone. The test is carried out in the following manner: Samples of the stocks are cured in the form of a belt ½" wide, ¼" thick and 5 5/16" in diameter and mounted on 1" diameter shafts. The ozone concentration is maintained at 20-30 parts per hundred million throughout the test and the shafts are rotated at 75 r.p.m. In this manner a momentary elongation through a range of 0-20% is provided at any portion of the test specimen passing over the shaft. (The apparatus and procedure employed is described in a paper of Creed et al. entitled "An Apparatus for the Evaluation of Ozone Protective Agents for Elastomers Under Dynamic Conditions" given at the Cincinnati, Ohio, meeting of the Rubber Division of the American Chemical Society May 1, 1952.) The experimental test specimens are compared visually at various intervals noting the extent of cracking. A stock which is severely cracked has no service life remaining in terms of the useful life of a rubber article and where the cracking is designated as extremely severe the degradation is well beyond even this point. The results of the tests of the unaged stocks and the stocks aged 48 hours in an air oven at 100° C. are set forth below:

Table I

| Stock | | Surface Cracking After Flexing in Ozone for— | | | |
|---|---|---|---|---|---|
| | | 24 Hrs. | 36 Hrs. | 48 Hrs. | 60 Hrs. |
| A | Unaged | slight | severe | severe | extremely severe. |
| B | do | none | none | very slight | slight. |
| C | do | do | do | do | Do. |
| D | do | do | do | none | none. |
| A | Aged | slight | moderate | severe | extremely severe. |
| B | do | none | very slight | slight | moderate. |
| C | do | do | do | do | Do. |

The resistance of the stocks to prevulcanization (scorch) was evaluated by means of a Mooney plastometer. The time required for incipient vulcanization or scorch was taken at the point on the plasticity curve when the plasticity began to rise continuously and reached an arbitrary value of 10 unit points above the minimum value.

Table II

Stock:                  Mooney scorch in mins. at 135° C.
A ---------------------------------------- 31
B ---------------------------------------- 37
C ---------------------------------------- 38
D ---------------------------------------- 39

As illustrative of the antioxidant properties, natural rubber stocks were compounded comprising:

| Stock | E | F | G | H |
|---|---|---|---|---|
| | Parts by weight | | | |
| Smoked Sheets | 100 | 100 | 100 | 100 |
| Carbon black | 50 | 50 | 50 | 50 |
| Saturated hydrocarbon softener | 3 | 3 | 3 | 3 |
| Zinc oxide | 5 | 5 | 5 | 5 |
| Stearic acid | 3 | 3 | 3 | 3 |
| Sulfur | 2.5 | 2.5 | 2.5 | 2.5 |
| N-Cyclohexyl 2-benzothiazole sulfenamide | 0.5 | 0.5 | 0.5 | 0.5 |
| N,N'-Dicyclohexyl-N,N'-dinitroso-p-phenylenediamine | | 1.5 | | |
| N,N'-Dicyclohexyl-N-nitroso-p-phenylenediamine | | | 1.5 | |
| N,N'-Di-sec-butyl-N,N'-dinitroso-p-phenylenediamine | | | | 1.5 |

The stocks were cured in the usual manner by heating in a press for 45 minutes at 144° C. Set forth below are the percentages of the original tensile retained after aging for 72 hours at 70° C. in an oxygen bomb under 300 pounds per square inch pressure.

Table III

Stock:                  Tensile retained, percent
E ---------------------------------------- 30.6
F ---------------------------------------- 73.7
G ---------------------------------------- 75.3
H ---------------------------------------- 77.9

The flexing characteristics of the vulcanized unaged stocks were determined by means of a Firestone flexing machine as described by L. V. Cooper, Analytical Edition of Industrial and Engineering Chemistry, vol. 2, No. 4, 1930, pages 391-394. The figures are the average number of flexings of 3 test pieces in kilocycles which the stocks underwent before failure.

Table IV

Stock:                  Kilocycles to failure
E ---------------------------------------- 114.5
F ---------------------------------------- 281
G ---------------------------------------- 302
H ---------------------------------------- 320

Other amounts may be employed than those indicated in the foregoing detailed examples. Amounts as low as 0.2% by weight on the rubber exhibit significant antiexposure cracking properties and higher amounts, as for example 5% by weight on the rubber, may be used to advantage where rubber articles are to be stored for long periods of time. For most purposes 0.5-3.0% will be satisfactory.

Practice of the invention is not confined to vulcanization with elemental sulfur. Organic sulfide vulcanizing agents are known, as for example, N,N'-dithiobis morpholine, and the new adjuvants may be used to advantage in compositions containing them. Thioamine vulcanizates lack resistance to flex cracking. However, the shortcoming was overcome by incorporating N,N'-dicyclohexyl-N,N'-dinitroso-p-phenylenediamine. The flex resistance was then superior to a similar stock cured with elemental sulfur.

It is intended to cover all changes and modifications of the examples of the invention herein chosen for purposes of disclosure which do not constitute departures from the spirit and scope of the invention.

What is claimed is:

1. A sulfur vulcanizable diene elastomer having incorporated therein 0.2%-5% of the elastomer sufficient to inhibit degradation an N-nitroso-N,N'-di-alicyclic phenylenediamine.

2. A sulfur vulcanizable diene elastomer having incorporated therein 0.2%-5% of the elastomer sufficient to inhibit degradation an N-nitroso-N,N'-di-alicyclic phenylenediamine.

3. A sulfur vulcanizable diene elastomer having incorporated therein 0.2-5.0% of the elastomer of a compound of the structure

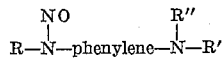

where R and R' are selected from the group consisting of saturated aliphatic, unsaturated aliphatic and alicyclic radicals and R" is selected from a group consisting of hydrogen and nitroso radicals.

4. A sulfur vulcanizable diene elastomer having incorporated therein 0.2%-5% of the elastomer sufficient to inhibit degradation a compound of the structure

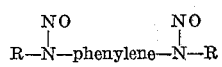

where R is an alkyl radical containing at least 4 but not more than 8 carbon atoms.

5. A sulfur vulcanizable diene elastomer having incorporated therein 0.2%–5% of the elastomer sufficient to inhibit degradation a compound of the structure

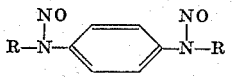

where R is an aliphatic hydrocarbon group containing at least 4 but not more than 8 carbon atoms.

6. A sulfur vulcanizable diene elastomer having incorporated therein 0.2%–5.0% of the elastomer of a compound of the structure

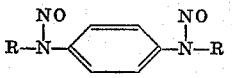

where R is an alkyl radical containing at least 4 but not more than 8 carbon atoms.

7. A sulfur vulcanizable diene elastomer having incorporated therein 0.2%–5% of the elastomer sufficient to inhibit degradation an N-nitroso-N,N'-dialkenyl-p-phenylenediamine.

8. A sulfur vulcanizable diene elastomer having incorporated therein 0.2%–5% of the elastomer sufficient to inhibit degradation N,N'-dicyclohexyl-N,N'-dinitroso-p-phenylenediamine.

9. A sulfur vulcanizable diene elastomer having incorporated therein 0.2%–5% of the elastomer sufficient to inhibit degradation N,N' - di-secondary-butyl-N,N'-dinitroso-p-phenylenediamine.

10. A sulfur vulcanizable diene elastomer having incorporated therein 0.2%–5% of the elastomer sufficient to inhibit degradation N,N' - dicyclohexyl - N - nitroso - p-phenylenediamine.

11. A sulfur vulcanizable diene elastomer having incorporated therein 0.2%–5% of the elastomer sufficient to inhibit degradation N,N' - dioctyl - N,N' - dinitroso - p-phenylenediamine.

12. A sulfur vulcanizable diene elastomer having incorporated therein 0.2%–5% of the elastomer sufficient to inhibit degradation N,N' - dioctenyl - N,N' - dinitroso-p-phenylenediamine.

References Cited in the file of this patent
UNITED STATES PATENTS

| | | |
|---|---|---|
| 1,869,657 | Bowers | Aug. 2, 1932 |
| 2,095,921 | Clifford | Oct. 12, 1937 |
| 2,342,136 | Gibbs | Feb. 22, 1944 |
| 2,798,860 | Hand et al. | July 9, 1957 |

UNITED STATES PATENT OFFICE
CERTIFICATE OF CORRECTION

Patent No. 2,901,459                              August 25, 1959

Dudley B. Merrifield

It is hereby certified that error appears in the printed specification of the above numbered patent requiring correction and that the said Letters Patent should read as corrected below.

Column 4, line 55, for "-di-alicyclic phenyl-" read -- -di-alicyclic-p-phenyl- --.

Signed and sealed this 23rd day of February 1960.

(SEAL)
Attest:

KARL H. AXLINE                                        ROBERT C. WATSON
Attesting Officer                                     Commissioner of Patents